United States Patent Office 3,573,272
Patented Mar. 30, 1971

3,573,272
CYCLAMMONIUM-5-AZO-PYRIMIDINE DYESTUFFS
Gunter Kaupp, Binningen, Basel-Land, and Hans Wegmuller and Jacques Voltz, Riehen, Switzerland, assignors to J. R. Geigy A.G., Basel, Switzerland
No Drawing. Filed May 20, 1968, Ser. No. 730,616
Claims priority, application Switzerland, June 14, 1967, 8,438/67
Int. Cl. C09b 29/36, 29/38, 62/24
U.S. Cl. 260—146
12 Claims

ABSTRACT OF THE DISCLOSURE

A class of cyclammonium-5-azo-pyrimidine dyestuffs wherein two of the carbon atoms in the 2-, 4- and 6-position of the pyrimidine ring are occupied by an optionally substituted amino group and the remaining one by an etherified hydroxyl or mercapto group or an optionally substituted amino group and wherein the cyclammonium component is a mono- or polynuclear aromatic heterocyclic system which contains a quaternized nitrogen atom as ring member; such dyestuffs being distinguished by good affinity for acrylic fibers, polyester fibers and polyamide fibers modified to contain acid dyesites. The dyestuffs produce dyeings which have excellent fastness to perspiration, washing, light and decatising.

DETAILED DISCLOSURE

The present invention concerns new cyclammonium azo dyestuffs, processes for their production, their use for the dyeing and printing of synthetic acid-modified hydrophobic fibers as well as, as industrial products, synthetic acid-modified hydrophobic fiber materials dyed with these dyestuffs.

More in particular, the invention provides cyclammonium-5-azo-pyrimidine dyestuffs of the Formula I, $$[A-N=N-\underset{Q_3-R_3}{\overset{Q_1-R_1}{\underset{N}{\bigcirc}}}-Q_2-R_2]^+ Y^- \quad (I)$$

wherein
A represents a cyclammonium radical, i.e. a quaternized radical of a mono-, di- or tricyclic, preferably a monocyclic or dicyclic aromatic N-heterocyclic system, which contains as one of its ring members a quaternized nitrogen group $$-\overset{+}{\underset{R_4}{N}}=$$

wherein $R_4$ represents an optionally substituted alkyl radical, preferably of not more than 4 carbon atoms, any substituent of which may be a carbamoyl, phenyl, cyano or lower alkoxycarbonyl group, and Wherein, in monocyclic systems, the hetro ring is 5- or 6-membered, and contains apart from the aforesaid quaternized nitrogen atom, from 0 to one further hetero ring member selected from nitrogen and sulphur and from 0 to two further nitrogen atoms as ring members, and Wherein, in dicyclic and tricyclic systems, one of the rings is a benzene or naphthalene ring, and the remaining ring is a 5- or 6-membered heterocyclic ring fused therewith and contains, apart from the aforesaid quaternized nitrogen atom, from 0 to one further hetero ring member selected from nitrogen and sulphur, as well as from 0 to one further nitrogen atom, All remaining ring members of said mono-, di- and tricyclic systems being carbon atoms, Any substituent of said heterocyclic ring other than $R_4$ may be, as C-substituents, a lower alkyl, lower alkoxy or a phenyl radical any substituent of which may be a lower alkyl or lower alkoxy group or halogeno and, as N substituents, a lower alkyl, cayno-lower alkyl, hydroxy-lower alkyl, benzyl, cyclohexyl or a phenyl radical any substituent of which may be halogeno, a lower alkoxy-carbonyl or lower alkyl group.

Any substituent of the benzene ring of said dicyclic system may be halogeno, a nitro, lower alkyl, lower alkoxy, lower alkyl-sulfonyl, cyano or thiocyano group; or A represents a radical of the formula $$B-\underset{}{\overset{R_5}{\bigcirc}}-$$

wherein
B represents a triazolyl radical, a benzothiazolyl-(2) radical or a benzimidazolyl-(2) radical, Any substituent of said triazolyl radical may be a lower alkoxy-carbonyl or loweralkyl group, Any substituent of the benzene rings of said benzothiazolyl and said benzimidazolyl radicals may be halogeno or a lower alkyl group, and $R_5$ represents hydrogen or a lower alkyl group;

One of $Q_1$, $Q_2$ and $Q_3$ represents —NH—, —O— or —S—, and the other two Q's represent —NH—;

And each of $R_1$, $R_2$ and $R_3$ represents an optionally substituted alkyl radical wherein the alkyl moiety proper has from 1 to 8 carbon atoms, cyclohexyl or an optionally substituted phenyl radical, and one of these R's can also represent a naphthyl;

Any substituent of the aforesaid alkyl radical may be a hydroxy, lower alkoxy, cyano, lower alkanoyloxy, phenyl, phenoxy, phenylthio, carbamoyl group, a grouping $$-N\underset{R''}{\overset{R'}{\diagup}}$$

or a grouping $$-\underset{R'_4}{\overset{R}{\underset{|}{N}}}\underset{R}{\overset{+}{\diagup}}\quad Y^-$$

in which groupings
$R'_4$ represents lower alkyl, benzyl or cyclohexyl,
Each of R' and R" represents hydrogen or lower alkyl;
R represents lower alkyl, and
$Y^-$ herein and in any other occurrence represents a colourless anion of an inorganic or organic acid;

Any substituent of the aforesaid substituted phenyl radical may be a lower alkyl, lower alkoxy group or halogeno;

"Halogeno" representing chloro or bromo.

Preferred because of their good accessibility are those of the Formula II, $$\left[A_1-N=N-\underset{Q_3-R_3}{\overset{Q_1-R_1}{\underset{N}{\bigcirc}}}-Q_2-R_2\right]^+ Y^- \quad (II)$$

wherein
$A_1$ is a cyclammonium radical of the formula, $$-\overset{}{\underset{}{C}}\overset{+}{\underset{}{N}}-R_4$$

having at least one and at most 3 nitrogen atoms as ring members, the first one of which is the nitrogen atom substituted by $R_4$, any second nitrogen ring member of $A_1$ being occupied by (a) An alkyl radical of at most 4 carbon atoms any substituent of which may be a carbamoyl, phenyl, cyano, hydroxy or lower alkoxycarbonyl group;
(b) A cyclohexyl group; or
(c) A phenyl radical any substituent of which may be halogeno, a lower alkyl or lower alkoxy group;

And any third nitrogen ring members of $A_1$ being unsubstituted;

And wherein the residue

is selected from a pyrazolyl-(5) radical, pyrazolyl-(4), an indazolyl-(3) radical, indazolyl-(5), indazolyl-(6), an optionally substituted thiazolyl-(2) radical, an optionally substituted benzothiazolyl-(2) radical, an optionally substituted 1,3,4-thiadiazolyl-(2) radical, 1,2,4-triazolyl-(5), 1,3,4-triazolyl-(2), 5-imino-1,2,4-triazolyl-(3), pyridyl, lower alkylpyridyl, quinolyl-(4), lower alkyl-quinolyl-(4), benzimidazolyl-(2) radical, benzimidazolyl-(7) radical the 2-position of which is occupied by hydrogen, benzotriazolyl-(7), benzothiazolyl-(2)-phenyl-(4′), 1,2,3-triazolyl-(1)-phenyl-(2′), an optionally substituted pyridazinyl-(3) radical, and naphtho-(1′,2′:4,5)-thiazolyl-(2);

Each of the 3- and 4-positions of said pyrazolyl-(5) radical being occupied by hydrogen, a lower alkyl or phenyl group;

Any substituent of said indazolyl-(3) radical being linked to the benzene nucleus thereof and may be halogeno, a nitro, lower alkyl, lower alkoxy or lower alkylsulfonyl group;

Any substituents of a carbon atom of said thiazolyl-(2) radical may be a lower alkyl, phenyl, halogeno-phenyl, lower alkyl-phenyl or lower alkoxy-phenyl group;

Any substituent of said benzothiazolyl-(2) radical being linked to the benzene nucleus thereof and may be halogeno, a lower alkyl, lower alkoxy, cyano or thiocyano group;

The 5-position of said 1,3,4-thiadiazolyl-(2) radical being occupied by hydrogen, a lower alkyl, phenyl, lower alkyl-phenyl or halogeno-phenyl group;

Any substituent of the benzene nuclei of said benzimidazolyl-(2) and benzimidazolyl-(7) radicals may be a lower alkyl, lower alkoxy group or halogeno; and Any substituent of said pyridazinyl-(3) radical may be halogeno or a lower alkoxy or phenyl group; and $Q_1$, $Q_2$, $Q_3$, $R_1$, $R_2$, $R_3$ and $Y^-$ have the aforesaid meanings.

In those components of Formula II, in which one of the bridges $Q_1$, $Q_2$ and $Q_3$ represents —O— or —S—, the respective group $R_1$, $R_2$ or $R_3$ linked thereby to the pyrimidine nucleus is preferably a lower alkyl or phenyl group, while the two remaining R's are linked to the pyrimidine nucleus via an —NH— bridge.

Preferred compounds under Formula II contain as $Q_1$, $Q_2$ and $Q_3$ three —NH— bridges.

Most preferred are those compounds of Formula II in which all three of $Q_1$, $Q_2$ and $Q_3$ are —NH— bridges, both of $R_1$ and $R_2$ are preferably identical lower alkyl groups and $R_3$ represents lower alkyl or an optionally substituted phenyl radical any substituent of which may be a lower alkyl or lower alkoxy group or halogeno.

Next preferred among those dyestuffs of Formula II in which one of $Q_1$ and $Q_2$ represents —O—, and the other Q and $Q_3$ each represent —NH—, are the dyestuffs in which one of the groupings —$Q_1$—$R_1$ and —$Q_2$—$R_2$ represents lower alkoxy or phenoxy.

The new cationic dyestuffs of Formula II are soluble in water to a varying degree depending on the type of anion and can be converted in a known manner by reaction with hetero polyacids, or with acid dyestuffs, into lacquer or pigment dyestuffs. They are also suited for the dyeing and printing of mordanted cotton and leather.

In particular, when subjected to heating in an open vessel or in a closed dyebath under pressure the novel dyestuffs draw substantially or completely onto acid-modified synthetic fibre materials from aqueous, neutral or, advantageously, from weakly acid solutions, optionally in the presence of wetting agents having a dispersing action such as condensation products of alkylene oxides and higher alkanols; the dyestuffs produce on these materials greenish yellow, yellow, orange, scarlet, red, violet and brown dyeings which have excellent fastness to perspiration, washing, milling, light and decatising.

Examples of acid-modified synthetic fibres are polyacrylonitrile fibres such as Orlon 42 or Acrilan, acid-modified polyester fibres, such as Dacron 64 and the acid-modified polyamide fibres known in the textile industry as Polyamide 844 and 830 and Perlon N.

Such acid-modified fibres consist, for example, particularly in the case of polyacrylonitrile fibres, of polymer molecules of a polymerization degree of 35,000 and contain, per 100 g. of polymer, from about 100 to 200 millimols of —COOH groups, or from about 100 to 200 millimols of —$SO_3H$ groups or mixtures of both.

Particularly preferred are those dyestuffs of Formula II in which the aforesaid residue

is selected from (i) the said pyrazolyl-(5) radical;
(ii) the said indazolyl-(3) radical;
(iii) the said thiazolyl-(2) radical;
(iv) the said benzothiazolyl-(2) radical;
(v) the said 1,3,4-thiadiazolyl-(2) radical;
(vi) 1,2,4-triazolyl-(5) radical;
(vii) lower alkyl-quinolyl-(4) radical; and
(viii) the said pyridazinyl-(3) radical.

Best accessible are those of the aforesaid particularly preferred dyestuffs of Formula II in which the said residue

is selected from (i) a 1-phenyl-3-lower alkyl-pyrazolyl-(5) radical any substituent of the phenyl moiety of which is selected from halogeno, lower alkyl and lower alkoxy;
(ii) 1,3-di-lower alkyl-pyrazolyl-(5);
(iii) an indazolyl-(3) radical any substituent of which is selected from halogeno and nitro;
(iv) thiazolyl-(2);
(v) lower alkyl-thiazolyl-(2);
(vi) benzothiazolyl-(2);
(vii) lower alkoxy-benzothiazolyl-(2);
(viii) 1,3,4-thiadiazolyl-(2);
(ix) lower alkyl-1,3,4-thiadiazolyl-(2);
(x) 1,2,4-triazolyl-(5);
(xi) lower alkyl-quinolyl-(4); and
(xii) 6-lower alkoxy-pyridazinyl-(3).

The novel dyestuffs of Formulae I and II according to the invention are obtained when an azo pyrimidine compound of the Formula III,

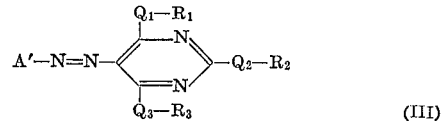

(III)

wherein

A′ represents the radical of a mono-, di- or tricyclic aromatic N-heterocyclic system which contains a ring nitrogen atom which can be quaternized, and $Q_1$, $Q_2$, $Q_3$, $R_1$, $R_2$ and $R_3$ have the aforesaid meanings, is reacted with a reactive ester of an aliphatic or aralliphatic alcohol with an inorganic or organic acid of the Formula IV, $$R_4\text{—}Y' \qquad (IV)$$

wherein $R_4$ has the meaning given above, and
$Y'$ represents a radical of an inorganic or organic acid, which radical is convertible during quaternization to the anion $Y^-$, to form a cycloammonum azo-pyrimidine dyestuff of the Formula I given above.

The starting materials are so chosen that the cationic moiety of the dye salt obtained has no groups which dissociate acid in water such as sulphonic acid, carboxylic acid or phosphonic acid groups.

The heterocyclic-aromatic radical corresponding to $A'$ can be derived from six-membered or, preferably five-membered, aromatic hetero rings containing nitrogen which belong to, e.g., the pyrazole, thiazole, imidazole, thiadiazole, triazole, tetrazole, pyridine or pyridazine series. Certain of these heterocycles can form either a component of a carbocyclic-heterocyclic condensed system or they can be monovalent substituents of an aromatic carbocycle.

When these hetero rings are carbocyclic-heterocyclic condensed ring systems they are, therefore, either those which are linked to the azo group by a carbon atom belonging to the hetero ring, or they are ring systems which are bound to the azo group by way of a ring carbon atom of an areno radical; the areno radical is advantageously at most dinuclear. Examples of such condensed ring systems are the five- or six-membered hetero rings mentioned above which are condensed with a naphthaline ring or, preferably, with an optionally substituted benzene ring, e.g. the benzothiazole, benzimidazole, indazole, benzotriazole or quinoline rings.

In the case of heterocycles which form monovalent substituents of an aromatic carbocycle, these hetero rings are advantageously external azole rings which e.g. are bound to the azo group by means of a phenylene radical. Examples thereof are the 1-methyl-benzimidazolyl-(2)-phenyl radical, 1,2,3-triazolyl-(1)-phenyl radical or the benzothiazolyl-(2) phenyl radical.

In preferred azo-pyrimidine compounds of Formula III usable according to the invention, $A'$ represents the radical of a six-membered, or preferably, five-membered, aromatic nitrogen-containing hetero ring which can contain a condensed, optionally substituted, carbocyclic-aromatic ring, particularly a benzo radical; in the latter case, the azo group is bound to a carbon atom belonging to the hetero ring.

As hydrocarbon radicals, $R_1$, $R_2$ and $R_3$ represent e.g. straight or branched chain alkyl groups having up to 8, preferably 1 to 5 carbon atoms, cycloalkyl groups such as the cyclohexyl or methylcyclohexyl group, aralkyl groups, particularly phenylalkyl groups such as the benzyl group, and carbocyclic aryl groups such as phenyl or naphthyl groups.

If the aliphatic hydrocarbon radicals are substituted, then substituents—particularly of the alkyl radicals—are e.g. hydroxyl or cyano groups, lower alkoxy groups having, preferably 1 to 4 carbon atoms, also acyloxy groups, particularly lower alkanoyloxy groups such as the acetyloxy or propionyloxy group, phenoxy groups, or primary, secondary, tertiary or quaternary amino groups.

If substituents of the pyrimidine ring have further substituted benzene rings, then these can also contain the non-ionogenic substituents usual in azo dyestuffs which are listed above, in particular halogens such as fluorine, chlorine or bromine, mainly however, lower alkyl or lower alkoxy groups.

In azo pyrimidine compounds of Formula III usable according to the invention, the substituents $R_1$, $R_2$ and $R_3$ are preferably each bound to the pyrimidine nucleus by way of an —NH— bridge, or by way of one oxygen bridge and two —NH— bridges.

If $R_4$ is an alkyl radical this is preferably straight chained and has 1 to 4 carbon atoms. This alkyl radical can contain non-ionogenic substituents, e.g. a cyano group, a carbamoyl group or a lower alkoxy carbonyl group such as the carbomethoxy or carboethoxy group. If $R_4$ is an aralkyl group, then it is preferably the benzyl radical.

In preferred cationic dyestuffs of Formulae I and II, $R_4$ is, however, the methyl or ethyl group.

Y, as inorganic anion is, e.g., the chlorine, bromine, iodine, phosphate or sulphate ion or the anion of a metal hydrohalic acid, e.g. the trichlorozincate anion. As organic anion, Y represents e.g. an acetate, alkylsulphate, or aryl sulphonate ion such as the benzene sulphonate or p-toluene sulphonate, ion, or also the oxalate ion.

"Lower" as used in this specification in connection with an aliphatic radical means that the latter has from 1 to 6 carbon atoms.

Many of the starting materials of Formula III are described in co-pending U.S. patent applications Ser. No. 681,554, Ser. No. 681,553, Ser. No. 681,552, Ser. No. 681,551 and Ser. No. 681,587 all filed on Nov. 8, 1967, or they can be produced in the known way, e.g. by coupling the diazonium compound of an aromatic N-heterocyclic amine with the corresponding pyrimidine coupling component, the coupling advantageously being performed in aqueous/acid medium and at low temperatures, preferably at a pH of 1 to 6.

Some of the pyrimidine compounds needed as coupling components for the production of starting materials of Formula III are known and are produced by known methods, e.g. by reacting the three chlorine atoms of the 2,4,6-trichloro-pyrimidine one after the other with primary aliphatic, cycloaliphatic, araliphatic or carbocyclic-aromatic amines or with a metal salt of an aliphatic, cycloaliphatic, araliphatic or carbocyclic-aromatic hydroxyl or mercapto compound. Preferably, less reactive amines are used in the first step and, in the second and third steps, easily reacting, more strongly basic amines and alcoholates, phenolates or mercaptides are used in any order desired. Generally, the products resulting from the first step are mixtures of isomers of 2-amino-4,6-dichloro-pyrimidines and 4-amino-2,6-dichloro-pyrimidines which if desired, can be separated by recrystallization or by chromatographic adsorption, e.g. on aluminium oxide. This separation, however, is not necessary for technical purposes.

The stepwise reaction is performed, e.g. in aqueous, organic or organic-aqueous solution or dispersion, optionally in the presence of acid binding agents such as alkali and alkaline earth carbonates or oxides, or tertiary nitrogen bases. Suitable organic solvents are, e.g., alcohols such as methanol, or ethanol, ethylene glycol monomethyl ether or monoethyl ether, preferably however, aliphatic ketones such as acetone, methylethyl ketone or methylisobutyl ketone; cyclic ethers, e.g. dioxane or tetrahydrofuran; optionally halogenated or nitrated aromatic hydrocarbons such as toluene, xylenes, chlorobenzene or nitrobenzene.

The first chlorine atom of the 2,4,6-trichloro-pyrimidine is reacted at low temperatures, advantageously, at 20–60° C., the second chlorine atom is reacted at medium temperatures, preferably at 70–100° C., and the third chlorine atom is reacted at higher temperatures, preferably between 80 and 180° C., optionally in a closed reaction vessel.

Examples of esters of Formula IV with the azo compound of Formula III is reacted to form the cyclammonium compounds of Formulas I and II are the methyl, ethyl, n-propyl, n-butyl, cyanoethyl and benzyl esters of hydrochloric acid, hydrobromic acid and hydroiodic acid, dimethyl and diethyl sulphate, the methyl, ethyl and butyl esters of benzene sulphonic acid and of p-toluene sulphonic acid, also the bromoacetic acid alkyl esters having an alkyl radical of, preferably, 1 to 4 carbon atoms. Instead of certain substituted alkanol esters, also their precursors can be used, e.g. instead of β-cyanoethyl- or β-carbamoyl-ethyl-chloride or -bromide, acrylonitrile or acrylamide can be used in the presence of hydrochloric or hydobromic acid. The preferred quatenising agent, however, is dimethyl sulphate.

The reaction of an azo dyestuff of Formula III with an ester of Formula IV to form cycloammonium compounds of Formulae I and II is advantageously performed by heating the two substances in an organic solvent not taking part in the reaction. Suitable solvents are e.g. optionally halogenated or nitrated aromatic hydrocarbons, e.g. toluene, xylenes, halogen-benzenes or nitro-benzenes, or optionally halogenated aliphatic hydrocarbons, e.g. chloroform, trichloroethylene, tetrachloroethylene, tetrachloroethane or trichloroethane.

The alkylating or aralkylating agent of Formula IV is advantageously used in excess. The primary, secondary and tertiary amino groups present as substituents in the starting material, or any ring nitrogen atoms to which hydrogen is attached present in hetero rings, are alkylated at the same time as the quaternisation of the azo dyestuff.

The new cycloammonium compounds of Formula I are formed as salts of the acids of the alkanol or aralkanol esters as defined, which are used for their production, i.e. dye salts of inorganic or organic acids. They are, thus, chiefly, chlorides, bromides, iodides, methosulphates, ethosulphates, benzene sulphonates or p-toluene sulphonates. If desired, salts of other acids can also be produced by double reaction in a suitable polar solvent, for example oxalates by the addition of oxalic acid. Double salts can also be produced, e.g. with the dyestuff halides and corresponding zinc or cadmium halides.

Particularly valuable azo-pyrimidine dye salts of Formula I which are distinguished, among other things, by very easy accessibility, good fastness properties and very great affinity to acid-modified synthetic fibres, as well as by good stability in the boiling bath, are derived from azo compounds of the Formula V

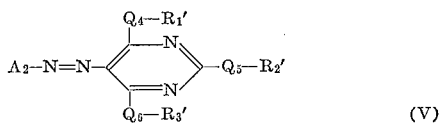

(V)

wherein $A_2$ represents the radical of a six-membered or, preferably five-membered, nitrogen-containing hetero ring system which can contain a fused benzene ring, $Q_4$, $Q_5$ and $Q_6$ each represent an —NH— bridge, and of $R_1'$, $R_2'$ and $R_3'$, one R' represents a lower alkyl radical or an optionally substituted phenyl radical and the other R's independently of each other each represent a lower alkyl radical.

A modification of the process according to the invention for the production of cyclammonium azo dyestuffs of Formula I wherein A is bound to the azo group by a ring carbon atom belonging to the hetero ring, consists in reacting a hydrazone of Formula VI, $$A''=N—NH_2 \quad (VI)$$

wherein

A″ represents the geminal divalent radical of a mono- or poly-nuclear hetero ring system derived from an aromatic heterocycle, which contains, as ring-forming member, the group

wherein $R_5$ represents lower alkyl, and wherein a ring carbon atom belonging to the hetero ring is linked to the hydrazone group, in the presence of an oxidising agent, with a pyrimidine compound of the Formula VII,

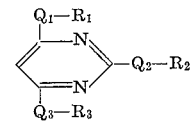

(VII)

wherein $Q_1$, $Q_2$, $Q_3$, $R_1$, $R_2$ and $R_3$ have the meanings given in Formula I, the starting materials being so chosen that the dyestuff cation obtained contains no groups which dissociate acid in water.

The heterocyclic radical A″ is an uncharged radical corresponding to the radical A in Formula I and can likewise be derived, e.g., from the 5- or 6-membered heterocycles mentioned above which optionally contain a fused benzene ring. It is always bound to the hydrazone grouping by a ring carbon atom belonging to the hetero ring.

Suitable hydrazones of Formula VI are, e.g., N-methyl-benzothiazolone-2-hydrazone, N-methyl-5- or -6-methoxy-benzothiazolone-2-hydrazone, 6-methoxy-2-methyl-pyridazinone-3-hydrazone, 1,2-dimethyl-5- or -6-nitro-indazolone-3-hydrazone, 1,2-dimethyl-indazolone-3-hydrazone, 1,2-dimethyl-6-chloro-indazolone-3-hydrazone, 1-methyl-pyridone-4-hydrazone, 1-methyl-quinolone-2-hydrazone, as well as the corresponding compounds substituted at the nitrogen atom of the heterocyclic ring by ethyl, butyl or benzyl radicals.

Naturally, the remarks in the first process regarding $Q_1$, $Q_2$, $Q_3$ $R_1$, $R_2$ and $R_3$ are true here too. The pyrimidine coupling components of Formula VII are produced as described above; any pyrimidine compounds containing amino groups to be quaternised as substituents of $R_1$, $R_2$ and $R_3$ can be reacted before the coupling with esters of Formula IV.

The oxidative coupling is generally performed at room temperature in aqueous acid medium. Certain organic solvents which are miscible with water such as acetic acid or dioxane can also be used.

Depending on the hydrazone, those oxidising agents having a weak, moderate or strong oxidising potential can be used. Examples of oxidising agents are peracetic acid and nitric acid perborates or persulphates, chromates or bichromates, lead dioxide, manganese dioxide, hydrogen peroxide, hypochlorites or hypobromites, chlorites, ferricyanides, iron-(III) or copper-(II) salts, permanganates and lead tetraacetate.

The dye salts formed by the modified process are advantageously precipitated by the addition of sodium chloride and/or zinc chloride and separated by filtration.

A second modification of the process according to the invention consists in coupling the diazonium compound of a quaternary amine of the Formula VIII,

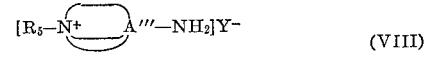

(VIII)

wherein

A‴ is a ring portion which together with N+ forms a 5-membered heterocyclic-aromatic ring system containing a carbocyclic-aromatic ring, which heterocycle is bound to the amino group by means of the carbocycle, or it forms together with N+ a 6-membered heterocyclic-aromatic ring system containing fused aromatic rings, and $R_5$ and Y⁻ have the meanings given above, with a pyrimidine compound of the Formula VII given above to form a cyclammonium azo dyestuff of the Formula IX,

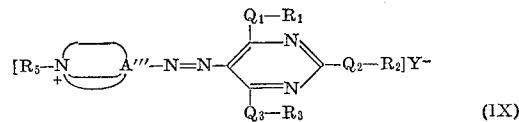

(IX)

wherein

A''' has the meaning given in Formula VIII and $Q_1$, $Q_2$, $Q_3$ $R_1$, $R_2$, $R_3$, $R_5$ and $Y^-$ have the meanings given in preceding formulae, the components being so chosen that the dyestuff cation obtained contains no groups which dissociate acid in water.

If the ring portion A''' makes up an azolium ring having a carbocyclic-aromatic ring, then this is e.g. a pyrazolium, imidazolium, thiazolium or triazolium ring which is fused with a benzene ring and/or is substituted by a phenyl radical, for instance the indazolium-, benzimidazolium-, benzothiazolium-, benzotriazolium- or the 1,2,3-triazolium-1-phenyl(4') radical or the benzothiazolium-2-phenyl-(4') radical.

If the remaining component A''' forms an aromatic fused azinium ring, this is e.g. the quinolinium or quinaldinium ring.

Examples of amines of Formula VIII are 1-(2'-aminophenyl)-1,2,3-triazole, 1-(2'-aminophenyl)-5-lower alkyl-1,2,3-triazoles, 2-(4'-aminophenyl)-1-lower alkyl benzimidazoles, 2-(4'-aminophenyl)-benzothiazole, 7-amino-1,2,3-benzotriazole, 7-amino-5-lower alkyl-1,2,3-benzotriazoles, 7-amino-5-chloro-1,2,3-benzotriazole, 1-lower alkyl-5-lower alkyl-7-aminobenzimidazoles, 1-lower alkyl-5-chloro-7-amino-benzimidazoles, 5-amino-indazole, 5-amino-7-lower alkyl-indazoles and 4-amino-2-methyl-quinoline.

The quaternary amines of Formula VIII are diazotised by known methods. Coupling is performed analogously to the way described in the first process.

The following non-limitative examples illustrate the invention further. The temperatures are given therein in degrees centigrade, and parts and percentages are by weight unless expressly stated otherwise.

Example 1

6.7 g. of the dyestuff of the formula

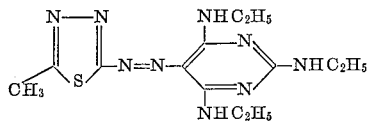

are intimately stirred at room temperature with 30 g. of dimethyl sulphate and heated for 5 minutes at 90–95° by means of a water bath. The yellow solution obtained is then poured into 600 g. of 80° hot water and stirred until a clear yellow solution is formed. At 70–80°, 15% sodium chloride solution and 3 g. of zinc chloride are added. It is cooled to 10°, the precipitated yellow product is filtered off, washed with 15% aqueous sodium chloride solution and dried. The dye salt, the composition of which corresponds to a mixture of isomers of the formula

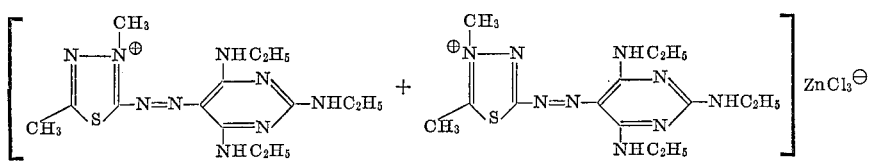

in a weight ratio of about 1:1, is a yellow coloured powder which dissolves easily in water and dyes acid modified polyacrylonitrile and polyamide fibres from an acetic acid bath in vivid yellow shades. The dyeings have excellent fastness to decatising.

The mixture of isomers obtained can be separated by chromatographic adsorption, e.g. on Silicagel. This separation, however, is not necessary for technical purposes as the properties of the isomers do not differ substantially.

The azo dyestuff used in the above example as starting material is obtained, e.g. by diazotising 2-amino-5-methyl-1,2,4-thiadiazole in the known way and then coupling with 2,4,6-tris-ethylamino-pyrimidine, e.g. in aqueous/acetic acid medium.

Example 2

7.0 g. of the dyestuff of the formula

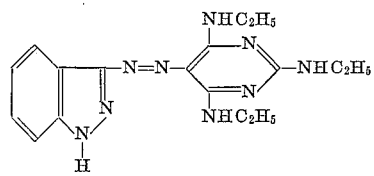

are intimately stirred for 15 minutes at 110° with 1.3 g. of magnesium oxide and 80 g. of chlorobenzene. A solution of 9.6 g. of dimethyl sulphate in 10 g. of chlorobenzene is added dropwise to the yellow suspension obtained, the addition being made within 10 minutes at 110–115°. After a short time, a clear yellow-orange solution is formed from which, after 25 minutes' reaction time, the basic dyestuff begins to precipitate. It is cooled to room temperature and the orange coloured precipitate is filtered off. This is washed with a little chlorobenzene and dried. The dried dyestuff, which dissolves easily in water with a yellow-orange colour, has the formula

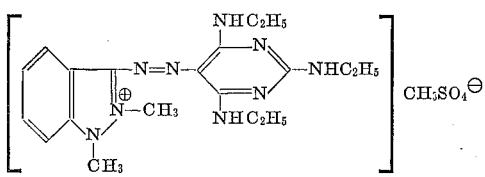

From an acetic acid bath, it dyes acid modified polyacrylonitrile fibres and acid modified polyamide fibres in vivid yellow-orange shades. The dyeings have excellent fastness to light, perspiration and decatising.

The azo dyestuff used as starting material in the above example is obtained, e.g. by diazotising 3-amino-indazole in the known way and then coupling with 2,4,6-tris-ethylamino-pyrimidine in the usual way.

By using instead of the azo dyestuff mentioned as starting material in the above example, coupling products which are formed from the diazo and coupling components given in columns 1 and 2 of Table I, and these are alkylated as described in the above example with the alkylating agents given in column 3, cationic dyestuffs are obtained which produce dyeings having similar good properties on acid-modified polyacrylonitrile, polyester and polyamide fibres. The shade of the dyeings obtained with the corresponding dyestuffs on acid-modified polyacrylonitrile fibres is given in the last column of the table.

TABLE I

| Example No. | Diazo component | Coupling component | Alkylating agent | Shade on acid modified polyacrylonitrile fibres |
|---|---|---|---|---|
| 3 | 5-amino-tetrazole | 2,4,6-tris-ethylaminopyrimidine | Dimethyl sulphate | Yellow-green. |
| 4 | 5-amino-1,2,4-triazole | do | do | Do. |
| 5 | 1,3-dimethyl-5-aminopyrazole | do | do | Do. |
| 6 | 1-phenyl-3-methyl-5-amino-pyrazole | do | do | Yellow. |
| 7 | 2-amino-thiazole | do | p-Toluene sulphonic acid methyl ester | Orange. |
| 8 | 2-amino-benzothiazole | do | Methyl iodide | Do. |
| 9 | 2-amino-6-methoxybenzothiazole | do | Diethyl sulphate | Red-orange. |
| 10 | 2-phenyl-5-amino-1,3,4-thiadiazole | do | Dimethyl sulphate | Yellow. |
| 11 | 2-(p-chlorophenyl)-5-amino-1,3,4-thiodiazole | do | p-Toluene sulphonic acid methyl ester | Do. |
| 12 | 5-amino-indazole | do | Diethyl sulphate | Do. |
| 13 | 3-amino-6-chlorindazole | do | Dimethyl sulphate | Orange. |
| 14 | 3-amino-5-nitroindazole | do | do | Red. |
| 15 | 3-amino-indazole | 2,4,6-tris-methylaminopyrimidine | do | Orange. |
| 16 | do | 2,4,6-tris-propylaminopyrimidine | do | Do. |
| 17 | do | 2,4,6-tris-butylaminopyrimidine | do | Do. |
| 18 | 2-amino-6-methoxybenzothiazole | 2,4,6-tris-isopropylamino-pyrimidine | do | Red-orange. |
| 19 | 3-amino-5-nitroindazole | 2-methyl-4-propylamino-6-isobutylamino-pyrimidine | do | Red. |
| 20 | do | 2,4,6-tris-methylaminopyrimidine | do | Red. |
| 21 | 2-amino-6-methoxybenzothiazole | 2-isobutylamino-4-(β-hydroxyethylamino)-6-cyclohexylamino-pyrimidine | do | Red-orange. |
| 22 | do | 2,4-bis-(β-hydroxyethylamino)-6-ethylamino-pyrimidine | do | Do. |
| 23 | do | 2,4-bis-ethylamino-6-(β-cyanoethylamino)-pyrimidine | do | Do. |
| 24 | 2-amino-6-cyanobenzothiazole | 2,4,6-tris-ethylaminopyrimidine | do | Do. |
| 25 | 2-amino-6-thiocyanobenzothiazole | do | do | Do. |
| 26 | 4-amino-2-methylquinoline | do | do | Do. |
| 27 | 4-amino-quinoline | do | do | Do. |
| 28 | 7-amino-benzimidazole | do | do | Yellow. |
| 29 | 7-amino-benzo-1,2,3-triazole | 2,4-bis-ethylamino-6-cyclo-hexylamino-pyrimidine | Diethyl sulphate | Do. |
| 30 | 2-(4'-aminophenyl)-6-methylbenzothiazole | 2,4-bis-methylamino-6-isopropylamino-pyrimidine | Dimethyl sulphate | Do. |
| 31 | 1-(2'-aminophenyl)-5-methyl-1,2,3-triazole | 2,4-bis-(β-hydroxyethylamino)-6-cyclohexylaminopyrimidine | do | Do. |
| 32 | 3-amino-5-imino-1,2,4-triazole | 2,4,6-tris-isopropylamino-pyrimidine | Diethyl sulphate | Do. |
| 33 | 7-amino-5-chloro-1-methyl-benzimidazole | 2,4-bis-(β-hydroxyethylamino)-6-ethylamino-pyrimidine | p-Toluene sulphonic acid methyl ester | Do. |
| 34 | 2-amino-(naphtho-1',2':4,5)-thiazole | 2,4,6-tris-ethylaminopyrimidine | Dimethyl sulphate | Red-orange. |
| 35 | 2-amino-4-phenylthiazole | 2,4-bis-ethylamino-6-methylamino-pyrimidine | do | Orange. |
| 36 | 5-amino-1,2,4-triazole | 2,4,6-tris-isopropylaminopyrimidine | do | Yellow-green. |
| 37 | do | 2,4,6-tris-methylamino-pyrimidine | do | Do. |
| 38 | 5-bromo-3-amino-indazole | 2,4,6-tris-ethylamino-pyrimidine | do | Orange. |
| 39 | 7-amino-5-bromo-benzimidazole | 2,4,6-tris-(β-hydroxyethylamino)-pyrimidine | do | Yellow. |
| 40 | 7-amino-5-methoxy-benzimidazole | do | do | Do. |
| 41 | 2-amino-5-(p-methylphenyl)-thiadiazole | 2,4,6-hexylamino-pyrimidine | do | Do. |

Example 42

9.5 g. of the dyestuff of the formula

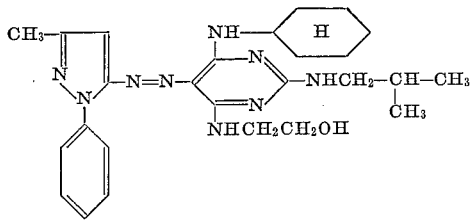

are dissolved at 110° in 80 g. of chlorobenzene. Then 3.5 g. of diethyl sulphate, dissolved in 10 g. of chlorobenzene, are added. After a short time, the basic dyestuff formed begins to precipitate from the solution in the form of fine needles. It is cooled to room temperature, the dyestuff formed is filtered off under suction and dried. The dried dyestuff, which dissolves in water with a yellow colour, has the formula

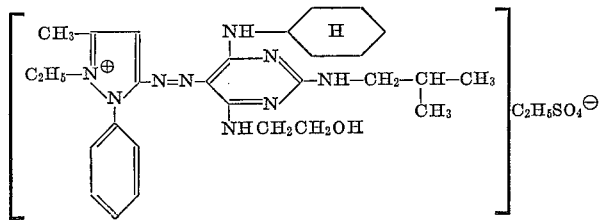

It dyes acid modified polyacrylonitrile, polyamide and polyester fibres from an acetic acid bath in vivid yellow shades. The dyeings have excellent fastness to light, perspiration and decatising.

The azo dyestuff used in the above example as starting material is obtained, e.g. by diazotising 1-phenyl-3-methyl-5-amino-pyrazole in the known way and then coupling in the usual way with 2-isobutylamino-4-(β-hydroxyethylamino)-6-cyclohexylamino-pyrimidine.

If instead of the azo dyestuff mentioned as starting material in the above example, coupling products which are formed by combining the diazo and coupling components given in columns 2 and 3 of Table II are used and these are alkylated with the alkylating agents given in column 4, by the procedure described in the foregoing examples, then cationic dyestuffs are obtained which yield dyeings on acid-modified polyacrylonitrile, polyamide and polyester fibres having similar good properties. The shade of the dyeings attained with the corresponding dyestuffs on acid modified polyacrylonitrile fibres is given in column 5 of the table.

TABLE II

| Example No. | Diazo component | Coupling component | Alkylating agent | Shade on acid modified polyacrylonitrile fibres |
|---|---|---|---|---|
| 43 | 3-amino-6-chloroindazole | 2,4-bis-methylamino-6-(β-methoxyethylamino)-pyrimidine. | Dimethyl sulphate | Orange. |
| 44 | 2-aminothiazole | 2,4-bis-cyclohexylamino-6-isopropylamino-pyrimidine. | p-Toluene sulphonic acid methyl ester. | Do. |
| 45 | 2-aminobenzothiazole | 2,4-bis-ethylamino-6-(β-cyanoethylamino)-pyrimidine. | Methyl iodide | Do. |
| 46 | 2-amino-6-methoxy-benzothiazole. | 2,4-bis-ethylamino-6-cyclohexylamino-pyrimidine. | Diethyl sulphate | Red-orange. |
| 47 | 5-amino-1,2,4-triazole | 2,4-bis-methylamino-6-benzylamino-pyrimidine. | Dimethyl sulphate | Yellow-green. |
| 48 | 1,3-dimethyl-5-aminopyrazole | 2,4-bis-ethylamino-6-(β-acetyloxy-ethylamino)-pyrimidine. | Methyl iodide | Do. |
| 49 | 1-phenyl-3,4-dimethyl-5-amino-pyrazole. | 2,4-bis-methylamino-6-(tert. butylamino)-pyrimidine. | Dimethyl sulphate | Yellow. |
| 50 | 3-amino-indazole | 2,4,6-tris-cyclohexylamino-pyrimidine | do | Orange. |
| 51 | do | 2,4,6-tris-butylamino-pyrimidine | Diethyl sulphate | Do. |
| 52 | do | 2,4,6-tris-isopropylamino-pyrimidine | Dimethyl sulphate | Do. |
| 53 | 1-(p-chlorophenyl)-3-phenyl-5-aminopyrazole. | 2,4-bis-ethylamino-6-(p-methyl-benzylamino)-pyrimidine. | do | Yellow. |
| 54 | 1-(m-bromophenyl)-3-methyl-5-amino-pyrazole. | 2,4-bis-methylamino-6-(p-chlorobenzyl-amino)-pyrimidine. | do | Do. |
| 55 | 1-(2'-methylphenyl)-3-methyl-5-amino-pyrazole. | 2,4-bis-ethylamino-6-(β-phenoxy-ethylamino)-pyrimidine. | do | Do. |
| 56 | 1-(4'-methoxyphenyl)-3-methyl-5-amino-pyrazole. | 2,4-bis-ethylamino-6-(β-phenylthio-ethylamino)-pyrimidine. | do | Do. |

Example 57

9.25 g. of the dyestuff of the formula

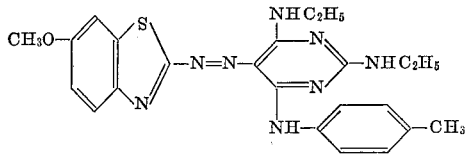

are slurried in 80 g. of chlorobenzene and, at 110°, 3.0 g. of dimethyl sulphate dissolved in 10 g. of chlorobenzene are added within 10 minutes. After about 20 minutes, it is cooled to room temperature, the red precipitate formed is filtered off under suction, washed with chlorobenzene and dried. The red, easily water soluble dyestuff has the formula:

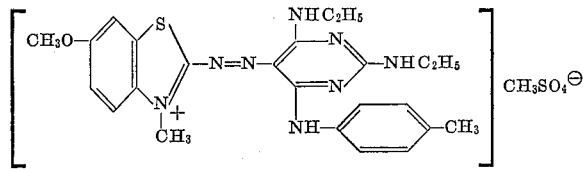

It dyes acid modified polyacrylonitrile, polyamide or polyester fibres from an acetic acid bath in red shades. The dyeings have good fastness to light, perspiration and decatising.

The alkylation can also be performed without solvent in pure dimethyl sulphate. Suitable solvents, in addition to chlorobenzene, are also dichlorobenzene, toluene and chloroform.

The azo dyestuff used in the above example as starting material is obtained, e.g. by diazotising 2-amino-6-methoxy-benzothiazole in the known way and then coupling in the usual way with 2,4-bis-ethylamino-6-(4'-methylphenylamino)-pyrimidine.

If instead of the azo dyestuff mentioned as starting material in the above example, coupling products are used which are formed by combining the diazo and coupling components given in columns 1 and 2 of Table III and these are alkylated according to the above example with the alkylating agents given in column 3, then cationic dyestuffs are obtained which produce dyeings having similar good properties on acid modified polyacrylonitrile, polyester and polyamide fibres. The shade of the dyeings attained with the corresponding dyestuffs on acid modified polyacrylonitrile fibres is given in the last column of the table.

TABLE III

| Example No. | Diazo component | Coupling component | Alkylating agent | Shade on acid modified polyacrylonitrile fibres |
|---|---|---|---|---|
| 58 | 2-aminothiazole | 2,4-bis-ethylamino-6-phenylamino-pyrimidine | Dimethyl sulphate | Orange. |
| 59 | do | 2,4-bis-methylamino-6-phenylamino-pyrimidine | do | Do. |
| 60 | do | 2-ethylamino-4-(β-hydroxyethylamino)-6-phenylamino-pyrimidine. | do | Do. |
| 61 | do | 2,4-bis-methylamino-6-(4'-methylphenyl-amino)-pyrimidine. | do | Do. |
| 62 | do | 2,4-bis-ethylamino-6-(4'-methylphenylamino)-pyrimidine. | do | Do. |
| 63 | do | 2,4-bis-ethylamino-6-(4'-methoxyphenylamino)-pyrimidine. | do | Tan. |
| 64 | do | 2,4-bis-ethylamino-6-(3'-methoxyphenylamino)-pyrimidine. | do | Orange. |
| 65 | do | 2,4-bis-ethylamino-6-(2'-methoxyphenylamino)-pyrimidine. | do | Tan. |
| 66 | do | 2,4-bis-ethylamino-6-(2'-methoxy-5'-methylphenylamino)-pyrimidine. | do | Tan. |
| 67 | do | 2,4-bis-ethylamino-6-(2'-chlorophenylamino)-pyrimidine. | do | Orange. |
| 68 | do | 2,4-bis-ethylamino-6-(4'-chlorophenylamino)-pyrimidine. | do | Do. |
| 69 | do | 2-ethylamino-4-(β-hydroxyethylamino)-6-(4'-methoxyphenylamino)-pyrimidine. | do | Tan. |
| 70 | 2-amino-5-methylthiazole | 2,4-bis-isopropylamino-6-(2'-chlorophenylamino)-pyrimidine. | do | Orange. |
| 71 | 2-amino-5-(4'-chlorophenyl)-thiazole. | 2,4-bis-isopropylamino-6-(4'-methoxyphenylamino)-pyrimidine. | do | Tan. |
| 72 | 2-amino-5-(4'-bromophenyl)-thiazole. | 2,4-bis-butylamino-6-(3'-bromophenylamino)-pyrimidine. | do | Orange. |
| 73 | 2-amino-5-(4'-methylphenyl)-thiazole. | 2-phenylamino-4,6-diethylamino-pyrimidine | do | Do. |
| 74 | 2-amino-5-(4'-methoxyphenyl)-thiazole. | 2,4-bis-(β-hydroxyethylamino)-6-phenylamino-pyrimidine. | do | Do. |
| 75 | 6-methyl-2-aminobenzothiazole | 2,4-bis-ethylamino-6-(4'-methoxyphenylamino)-pyrimidine. | Diethyl sulphate | Tan. |

TABLE III.—Continued

| Example No. | Diazo component | Coupling component | Alkylating agent | Shade on acid modified polyacrylonitrile fibres |
|---|---|---|---|---|
| 76 | 6-chloro-2-aminobenzothiazole | do | do | Tan. |
| 77 | 6-bromo-2-aminobenzothiazole | do | do | Tan. |
| 78 | 2-aminobenzothiazole | 2,4-bis-ethylamino-6-phenylamino-pyrimidine | Dimethyl sulphate | Orange. |
| 79 | do | 2,4-bis-methylamino-6-phenylamino-pyrimidine | do | Do. |
| 80 | do | 2-ethylamino-4-(β-hydroxyethylamino)-6-phenylamino-pyrimidine | do | Do. |
| 81 | do | 2,4-bis-methylamino-6-(4'-methylphenylamino)-pyrimidine | do | Do. |
| 82 | do | 2,4-bis-ethylamino-6-(4'-methylbenzylamino)-pyrimidine | do | Do. |
| 83 | do | 2,4-bis-ethylamino-6-(4'-methoxyphenylamino)-pyrimidine | do | Do. |
| 84 | do | 2,4-bis-ethylamino-6-(3'-methoxyphenylamino)-pyrimidine | do | Do. |
| 85 | do | 2,4-bis-ethylamino-6-(2'-methoxyphenylamino)-pyrimidine | do | Tan. |
| 86 | do | 2,4-bis-ethylamino-6-(2'-methoxy-5'-methylphenylamino)-pyrimidine | do | Tan. |
| 87 | do | 2,4-bis-ethylamino-6-(2'-chlorophenylamino)-pyrimidine | do | Orange. |
| 88 | do | 2,4-bis-ethylamino-6-(4'-chlorophenylamino)-pyrimidine | do | Do. |
| 89 | do | 2-ethylamino-4-(β-hydroxyethylamino)-6-(4'-methoxyphenylamino)-pyrimidine | do | Tan. |
| 90 | 2-amino-6-methoxy-benzothiazole | 2,4-bis-methylamino-6-phenylamino-pyrimidine | do | Red. |
| 91 | do | 2,4-bis-ethylamino-6-phenylamino-pyrimidine | do | Red. |
| 92 | do | 2,4-bis-ethylamino-6-(2'-methoxy-5'-methylphenylamino)-pyrimidine | do | Bordeaux. |
| 93 | do | 2,4-bis-methylamino-6-(4'-methylphenylamino)-pyrimidine | do | Red. |
| 94 | do | do | Benzylbromide | Red. |
| 95 | do | 2,4-bis-isopropylamino-6-(4'-chlorophenylamino)-pyrimidine | Dimethyl sulphate | Red. |
| 96 | do | 2,4-bis-phenylamino-6-ethylamino-pyrimidine | do | Red-violet. |
| 97 | do | 2,4,6-tris-phenylamino-pyrimidine | do | Violet. |
| 98 | do | 2,4-bis-methylamino-6-(4'-methoxyphenylamino)-pyrimidine | do | Tan. |
| 99 | do | 2,4-bis-ethylamino-6-(4'-methoxyphenylamino)-pyrimidine | do | Tan. |
| 100 | do | 2-ethylamino-4-(β-hydroxyethylamino)-6-phenylamino-pyrimidine | do | Red. |
| 101 | do | 2-ethylamino-4-(β-hydroxyethylamino)-6-(4'-methoxyphenylamino)-pyrimidine | do | Tan. |
| 102 | do | 2,4-bis-ethylamino-6-(2'-methylphenylamino)-pyrimidine | do | Red. |
| 103 | do | 2,4-bis-ethylamino-6-(3'-methoxyphenylamino)-pyrimidine | do | Red. |
| 104 | do | 2,4-bis-ethylamino-6-(2'-chlorophenylamino)-pyrimidine | do | Red. |
| 105 | do | 2,4-bis-methylamino-6-(2'-chlorophenylamino)-pyrimidine | Diethyl sulphate | Red. |
| 106 | do | 2,4-bis-ethylamino-6-phenylaminopyrimidine | ω-Bromopropionic acid | Red. |
| 107 | do | do | ω-Bromopropionitrile | Red. |
| 108 | do | do | Benzyl bromide | Red. |
| 109 | 5-amino-1,2,4-triazole | do | Dimethyl sulphate | Yellow. |
| 110 | do | 2,4-bis-methylamino-6-phenylamino-pyrimidine | do | Do. |
| 111 | do | 2-ethylamino-4-(β-hydroxyethylamino)-6-phenylamino-pyrimidine | do | Do. |
| 112 | do | 2,4-bis-methylamino-6-(4'-methylphenylamino)-pyrimidine | do | Do. |
| 113 | do | 2,4-bis-ethylamino-6-(4'-methylphenylamino)-pyrimidine | do | Do. |
| 114 | do | 2,4-bis-ethylamino-6-(2'-methylphenylamino)-pyrimidine | do | Do. |
| 115 | do | 2,4-bis-phenylamino-6-methylamino-pyrimidine | Diethyl sulphate | Do. |
| 116 | do | 2,4-bis-methylamino-6-(4'-methoxyphenylamino)-pyrimidine | Dimethyl sulphate | Dark yellow. |
| 117 | do | 2,4-bis-ethylamino-6-(4'methoxyphenylamino)-pyrimidine | do | Do. |
| 118 | do | 2,4-bis-ethylamino-6-(2'-methoxyphenylamino)-pyrimidine | do | Do. |
| 119 | do | 2,4-bis-methylamino-6-naphthyl-(1')amino-pyrimidine | do | Do. |
| 120 | do | 2,4-bis-methylamino-6-naphthyl-(2')-amino-pyrimidine | do | Do. |
| 121 | do | 2,4-bis-ethylamino-6-(2'-chlorophenylamino)-pyrimidine | do | Yellow. |
| 122 | do | 2,4-bis-methylamino-6-(2'-chlorophenylamino)-pyrimidine | do | Do. |
| 123 | do | 2,4-bis-methylamino-6-(3'-methoxyphenylamino)-pyrimidine | do | Dark yellow. |
| 124 | 1-(2'-aminophenyl)-5-carboethoxy-1,2,3-triazole | 2,4-bis-ethylamino-6-phenylamino-pyrimidine | Diethyl sulphate | Yellow. |
| 125 | 2-amino-1,3,4-triazole | 2,4-bis-ethylamino-6-(4'-methoxyphenylamino)-pyrimidine | Dimethyl sulphate | Do. |
| 126 | 3-aminopyrazole | 2,4-bis-methylamino-6-(naphthyl-(1')-amino-pyrimidine | do | Do. |
| 127 | 1,3-dimethyl-5-aminopyrazole | 2,4-bis-ethylamino-6-phenylaminopyrimidine | do | Do. |
| 128 | 3,4-dimethyl-5-aminopyrazole | 2,4-bis-ethylamino-6-(4'-methoxyphenylamino)-pyrimidime | do | Dark yellow. |
| 129 | 1,3-dimethyl-5-aminopyrazole | 2,4-bis-methylamino-6-(4'-methoxyphenylamino)-pyrimidine | Methyl tosylate | Do. |
| 130 | 1-phenyl-3-methyl-4-phenyl-5-amino-pyrazole | 2-ethylamino-4-(β-hydroxy-ethylamino)-6-phenylamino-pyrimidine | Dimethyl sulphate | Yellow. |
| 131 | 1-isopropyl-3-methyl-5-amino-pyrazole | 2,4-bis-ethylamino-6-(4'-chlorophenylamino)-pyrimidine | Bromoacetamide | Dark yellow. |
| 132 | 1-cyclohexyl-3-methyl-5-amino-pyrazole | 2,4-bis-methylamino-6-octylamino-6-phenylamino-pyrimidine | Diethyl sulphate | Yellow. |
| 133 | 1-benzyl-3-methyl-5-amino-pyrazole | 2,4-bis-methylamino-6-(4'-bromophenylamino)-pyrimidine | do | Do. |
| 134 | 1-isopropyl-3-methyl-5-amino-pyrazole | 2,4-bis-ethylamino-6-(4'-methylphenylamino)-pyrimidine | do | Do. |
| 135 | do | 2,4-bis-methylamino-6-(2'-chlorophenylamino)-pyrimidine | do | Do. |

TABLE III.—Continued

| Example No. | Diazo component | Coupling component | Alkylating agent | Shade on acid modified polyacrylonitrile fibres |
|---|---|---|---|---|
| 136 | 1-phenyl-3-methyl-5-amino-pyrazole. | 2-ethylamino-4-(β-hydroxyethylamino)-6-phenyl-amino-pyrimidine. | Dimethyl sulphate | Do. |
| 137 | do | 2,4-bis-methylamino-6-(4'-methoxyphenylamino)-pyrimidine. | do | Dark yellow. |
| 138 | do | 2,4-bis-ethylamino-6-(4'-methoxyphenylamino)-pyrimidine. | do | Do. |
| 139 | do | 2,4-bis-ethylamino-6-phenylamino-pyrimidine | do | Yellow. |
| 140 | do | 2,4-bis-ethylamino-6-(2'-methoxy-5'-methylphenyl-amino)-pyrimidine. | do | Orange. |
| 141 | 2-methyl-5-amino-(1,3,4)-thiadiazole. | 2,4-bis-ethylamino-6-(4'-methoxy-phenylamino)-pyrimidine. | do | Tan. |
| 142 | 2-amino-pyridine | 2,4-bis-ethylamino-6-phenylamino-pyrimidine | Diethyl sulphate | Orange red. |
| 143 | 3-amino-pyridine | 2,4-bis-isopropylamino-6-(4'-methoxyphenyl-amino)-pyrimidine. | do | Yellow. |
| 144 | 4-amino-pyridine | 2,4-bis-hexylamino-6-phenylamino-pyrimidine | do | Orange red. |
| 145 | 2-methyl-4-aminopyridine | 2,4-bis-methylamino-6-phenylamino-pyrimidine | do | Do. |
| 146 | 2-methyl-4-aminoquinoline | 2,4-bis-ethylamino-6-phenylamino-pyrimidine | do | Red. |
| 147 | do | do | Dimethyl sulphate | Red. |
| 148 | 2-amino-1-ethyl-benzimidazole | 2-ethylamino-4-phenylamino-6-cyclohexylamino-pyrimidine. | do | Orange. |
| 149 | 3-aminoindazole | 2,4,6-tris-phenylamino-pyrimidine | do | Red. |
| 150 | do | 2,4-bis-ethylamino-6-phenylamino-pyrimidine | do | Orange. |
| 151 | do | do | Bromoacetic acid ethyl ester | Do. |
| 152 | do | 2,4-bis-methylamino-6-(4'-methylphenylamino)-pyrimidine. | Dimethyl sulphate | Do. |
| 153 | do | 2,4-bis-methylamino-6-(4'-methoxyphenylamino)-pyrimidine. | do | Do. |
| 154 | do | 2,4-bis-ethylamino-6-(4'-methoxyphenylamino)-pyrimidine. | do | Do. |
| 155 | do | 2-ethylamino-4-β-hydroxy-ethylamino-6-phenyl-amino-pyrimidine. | do | Do. |
| 156 | do | 2,4-bis-ethylamino-6-(2'-chlorophenylamino)-pyrimidine. | do | Dark yellow. |
| 157 | do | 2,4-bis-ethylamino-6-naphthyl-(1')-amino-pyr-imidine. | do | Red-orange. |
| 158 | 4-methyl-3-aminoindazole | 2,4-bis-ethylamino-6-phenylaminopyrimidine | do | Orange. |
| 159 | 4-methoxy-3-aminoindazole | do | do | Do. |
| 160 | 6-aminoindazole | do | do | Yellow. |
| 161 | 3-amino-5-nitro-indazole | do | do | Red. |
| 162 | 3-amino-6-chloro-indazole | do | do | Orange. |
| 163 | 1-phenyl-5-nitro-3-amino-indazole. | do | do | Red. |
| 164 | 1-(β-cyanoethyl)-5-nitro-3-amino-indazole. | do | do | Red. |
| 165 | 1-(β-hydroxyethyl)-5-nitro-3-amino-indazole. | do | do | Red. |
| 166 | 1-cyclohexyl-5-nitro-3-amino-indazole. | do | do | Red. |
| 167 | 1-ethyl-2-amino-6-chloro-benz-imidazole. | 2-phenylamino-4-ethylamino-6-(β-hydroxyethyl-amino)-pyrimidine. | do | Orange. |
| 168 | 1-ethyl-2-amino-6-methylbenz-imidazole. | 2-(β-hydroxyethylamino)-4-phenylamino-6-ethyl-amino-pyrimidine. | do | Do. |

The dyestuff methosulphates of Examples 58 to 168 obtained by following the procedure of Example 57 are converted to the chlorides, bromides, or zinc-chlorides (ZnCl$_3^-$) by removal of the solvent by steam distillation, and adding salts of the corresponding acid, e.g. sodium chloride, sodium bromide or zinc chloride/hydrochloric acid to the aqueous solution resulting from the steam distillation.

Example 169

8.66 g. of the dyestuff of the formula

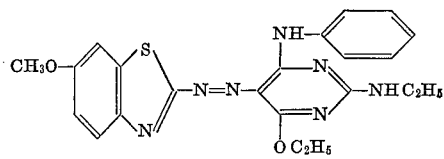

are slurried in 40 g. of dimethyl sulphate and the slurry is heated on a water bath at 95° for 10 minutes. The contents of the vessel are then poured into 400 ml. of 80° hot water, the whole is stirred until a clear red solution is formed to which 60 g. of sodium chloride are added. On cooling to room temperature, the basic dyestuff precipitates. It is filtered off under suction, washed with 15% aqueous sodium chloride solution and dried. The easily water soluble red dyestuff has the formula

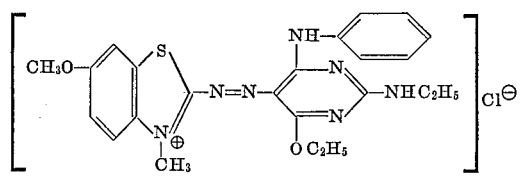

It dyes acid modified polyacrylonitrile, polyamide and polyester fibres from an acetic acid bath in deep red shades. The dyeings have excellent fastness to decatising.

The azo dyestuff used as starting material in the above example is obtained, e.g. by diazotising 2-amino-6-methoxy-benzothiazole in the known way and then combining with the coupling component 2-ethylamino-4-phenylamino-6-ethoxy-pyrimidine in the usual way.

If instead of the azo dyestuff mentioned in the above example as starting material, coupling products are used which are formed by combining the diazo and coupling components given in columns 1 and 2 of Table IV and these are alkylating with the alkylating agents given in column 3 according to the above example, then cationic dyestuffs are obtained which produce dyeings having similar properties on acid modified polyacrylonitrile, polyester and polyamide fibres. The shade of the dyeings obtained with the corresponding dyestuffs on acid modified polyacrylonitrile fibres is given in the last column of the table.

TABLE IV

| Example No. | Diazo component | Coupling component | Alkylating agent | Shade on acid modified polyacrylonitrile fibres |
|---|---|---|---|---|
| 170 | 3-amino-indazole | 2,4-bis-ethylamino-6-isopropoxypyrimidine | Diethyl sulphate | Orange. |
| 171 | 2-amino-thiazole | 2,4-bis-methylamio-6-ethoxypyrimidine | p-Toluene sulphonic acid methyl ester. | Do. |
| 172 | 3-amino-6-chloroindazole | 2-ethylamino-4-phenylamino-6-butoxy-pyrimidine. | Dimethyl sulphate | Red-orange. |
| 173 | 1,3-dimethyl-5-aminopyrazole | 2,4-bis-ethylamino-6-phenylthiopyrimidine | do | Yellow-green. |
| 174 | 3-amino-pyridine | 2,4-bis-ethylamino-6-butylthiopyrimidine | Diethyl sulphate | Yellow. |
| 175 | 5-amino-pyrazole | 2-ethylamino-4-methoxy-6-phenylamino-pyrimidine. | do | Do. |
| 176 | 1-phenyl-3-methoxy-5-amino-pyrazole. | 2,4-bis-ethylamino-6-phenoxy-pyrimidine | do | Do. |

In the case of all those of Examples 3 to 176 in which the diazo component contains two or more quaternizable nitrogen atoms as ring members, the dye salts are obtained in the form of two isomers analogous to Example 1 in the weight ratio given in the latter.

Example 177

26.0 g. of 1,2-dimethyl-5-nitro-indazolone-3-hydrazone hydrochloride are dissolved in 500 ml. of water. A solution of 21.0 g. of 2,4,6-tris-ethylamino-pyrimidine in 50 g. of acetic acid is added and, while stirring, a solution of 10 g. of sodium chlorite in 100 ml. of water is added dropwise to the reaction mixture within 30 minutes. After a short time it turns red. It is then heated for 4 hours at 60-70° and the dyestuff formed is precipitated by the addition of 70 g. of sodium chloride. It is filtered off under suction, washed with 10% aqueous sodium chloride solution and dried. 34 g. of a dyestuff are obtained. The dyestuff dissolves in water with a red colour and has the formula

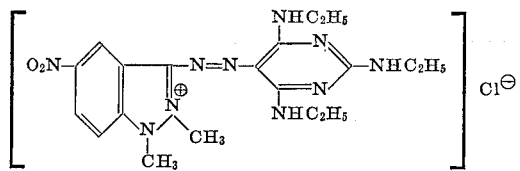

From an acetic acid bath, the dyestuff dyes acid modified polyacrylonitrile fibres in deep red shades. The dyeings have excellent light fastness.

Dyestuffs of similar properties are obtained by repeating the procedure set forth in the examples given in the second column of the following Table V but using as starting hydrazones those given in the second column, as pyrimidine coupling components those given in the third column, and as oxidising agents those given in the fourth column of Table V, these dyestuffs dye acid-modified polyacrylonitrile fibres in the shades given in the last column of the said table.

Example 186

18 g. of 2-amino-6-methoxy-benzothiazole are diazotized in the usual way. The diazonium salt solution so obtained is added dropwise at 0-5° to a solution of 32.0 g. of 2-ethylamino-4-phenylamino-6-(γ-dimethylaminopropylamino)-pyrimidine in 400 ml. of 80% acetic acid and 600 ml. of water. The acid solution is neutralized with 10% sodium hydroxide solution and then made alkaline with 10% sodium carbonate solution whereupon the dyestuff formed is filtered off under suction, washed with water and dried.

25 g. of the dyestuff so obtained are slurried in 300 g. of chlorobenzene and the suspension is heated to 110° whereupon the dyestuff dissolves. A solution of 14.0 g., of dimethyl sulphate in 30 g. of chlorobenzene is then added dropwise. The whole is stirred for about 30 minutes at 110-115°, then cooled to room temperature and the red precipitate formed is filtered off under suction, washed with chlorobenzene and dried. The dyestuff, which dissolves in water with a red colour, has the formula

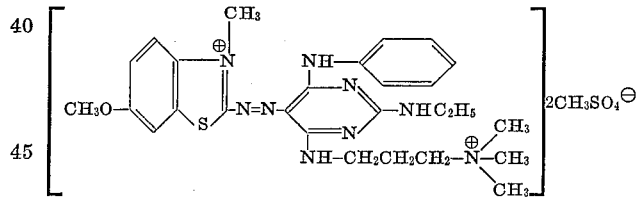

It dyes acid-modified polyacrylonitrile, polyester and polyamide fibres from an acetic acid bath in vivid red shades. The dyeings have excellent fastness to light and decatising.

If instead of the diazo and coupling components or the alkylating agent given in the above example, equivalent amounts of any of the corresponding compounds given in the following Table VI are used with otherwise the procedure described in the example, then cationic dyestuffs are obtained which produce dyeings having similarly good properties on acid modified polyacrylonitrile fibres. The shade of these dyeings is given in the last column of the table.

TABLE V

| Example No. | Hydrazone | Coupling component | Oxidising agent | Shade on acid modified polyacrylonitrile fibres |
|---|---|---|---|---|
| 178 | 1,2-dimethyl-indazolone 3-hydrazone | 2,4-bis-ethylamino-6-(γ-dimethylaminopropylamino)-pyrimidine. | Sodium chloride | Orange. |
| 179 | 6-methoxy-2-methyl-pyridazinone-3-hydrazone. | 2,4-bis-ethylamino-6-phenylaminopyrimidine | do | Do. |
| 180 | 1,2-dimethyl-6-nitroindazolone-3-hydrazone | do | do | Red. |
| 181 | 1,2-dimethyl-6-chloroindazolone-3-hydrazone | do | do | Orange. |
| 182 | 3-methylbenzthiazolone-2-hydrazone | do | do | Do. |
| 183 | 6-chloro-2-methyl-pyridazinone-3-hydrazone | 2,4,6-tris-ethylamino-pyrimidine | do | Do. |
| 184 | 6-phenyl-2-methyl-pyridazinone-3-hydrazone | 2,4-bis-ethylamino-6-(4′-methoxyphenylamino)-pyrimidine. | do | Tan. |
| 185 | 1,2,3-tris-methylpyrazolone-5-hydrazone | do | do | Dark yellow. |

TABLE VI

| Example No. | Diazo component | Coupling component | Alkylating agent | Shade on acid modified polyacrylonitrile fibres |
|---|---|---|---|---|
| 187 | 3-amino-indazole | 2,4-bis-ethylamino-6-(β-dimethylamino-ethylamino)-pyrimidine. | Dimethyl sulphate | Orange. |
| 188 | 2-amino-1,3,4-thiodiazole | 2,4-bis-ethylamino-6-(γ-dimethylamino-propoxy)-pyrimidine. | Diethyl sulphate | Yellow. |
| 189 | 5-amino-1,2,4-triazole | 2,4-bis-isopropylamino-6-(β-dimethylamino-ethoxy)-pyrimidine. | p-Toluene sulphonic acid methyl ester. | Yellow-green. |
| 190 | 2-amino-thiazole | 2-ethylamino-4-(4'-methylphenylamino)-6-(-β dimethylamino-ethylamino)-pyrimidine. | Dimethyl sulphate | Orange. |
| 191 | 1-phenyl-3-methyl-5-amino-pyrazole. | 2-ethylamino-4-cyclohexylamino-6-(γ-dimethylamino-propylamino)-pyrimidine. | Diethyl sulphate | Yellow. |

Example 192

28.7 g. of 1,3,5-trimethyl-7-amino-benzimidazolium methyl sulphate in 300 ml. of water and 70 ml. of 5 N hydrochloric acid are diazotised in the usual way at 0–5° with 20.5 ml. of 5 N sodium nitrite solution. A solution of 21.0 g. of 2,4,6-tris-ethylamino-pyrimidine in 300 g. of 30% acetic acid is slowly added to the diazonium salt solution while stirring. On completion of the coupling, a yellow solution of the dyestuff has formed. Then, in aqueous zinc chloride solution, the zinc chloride complex salt of the formula

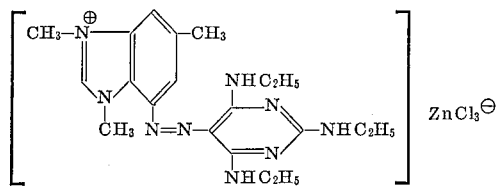

is precipitated, filtered off under suction, washed with a little cold water and dried at 60°. The dye salt dissolves well in water with a yellow colour and dyes acid modified polyacrylonitrile and polyamide fibres from an acetic acid bath in fast yellow shades.

Example 193

28.4 g. of 4-amino-1,2-dimethyl quinolinium methyl sulphate are dissolved at 20–25° in 50 ml. of 80% sulphuric acid. The solution is cooled to 10° and, within 10 minutes, 15.5 ml. of 43.8% nitrosyl sulphuric acid are added dropwise. The clear, yellow-red-brown diazo solution is then added dropwise, within 30 minutes, to a solution of 27.5 g. of 2,4-bis-ethylamino-6-(4'-methylphenylamino)-pyrimidine in 200 ml. of water and 150 g. of 80% acetic acid. The whole is stirred for 30 minutes at room temperature and crystallised sodium acetate and sodium chloride are added. 20 ml. of 70% zinc chloride solution are then added dropwise whereupon the zinc chloride double salt of the formula

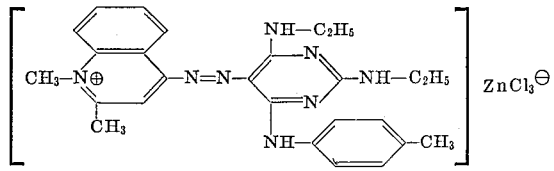

precipitates. After it has completely precipitated, the dyestuff is filtered off under suction, washed with sodium chloride solution and dried at 60°. The dye salt obtained dissolves well in water with a red colour and dyes acid-modified polyacrylonitrile fibres and acid-modified polyamide fibers from an acetic acid bath in fast red shades.

Example 194

0.5 g. of the dyestuff produced according to Example 2 are slurried with 0.5 g. of 80% acetic acid and dissolved in 4000 g. of hot water. 1.0 g. of 80% acetic acid, 2 g. of sodium acetate and 4 g. of a condensation product of olein alcohol and 15 mols of ethylene oxide are also added. The pH of this solution is about 4.5. 100 g. of acid-modified polyacrylonitrile fabric are introduced at 50°, the temperature is raised to 100° within 15 minutes and dyeing is performed for 1 hour at the boil. At the end of this time, the dyebath is for all practical purposes exhausted. The dyed goods are treated for 15 minutes at 80° with the solution of 5 g. of a fatty alcohol sulphonate and then rinsed and dried. The fabric which has been dyed a vivid yellow-orange shade has excellent fastness to decatising and light.

Example 195

0.5 g. of the colour salt produced according to Example 57 are slurried with 0.5 g. of 80% acetic acid and dissolved in 4000 g. of hot water. 1.0 g. of 80% acetic acid, 2 g. of sodium acetate and 4 g. of a condensation product of olein alcohol and 15 mols of ethylene oxide are also added to the solution obtained. The pH of the solution is about 4.5. 100 g. of acid modified polyamide fabric, e.g. Perlon N, are introduced at 50°, the temperature is raised within 15 minutes to 100° and dyeing is performed at the boil for 1 hour. At the end of this time the dyebath is for all practical purposes exhausted. The dyed goods are treated for 15 minutes at 80° with the solution of 5 g. of a fatty alcohol sulphonate and then rinsed and dried. The red coloured fabric is excellently fast to light, perspiration and decatising.

Similar dyeings of good fastness to wet treatments and to light are obtained when using in lieu of Perlon N, acid-modified fibers produced as described in Example 1 of British Pat. No. 901,939 or the fibers produced as described in other examples of the aforesaid patent or in the examples of British Pat. 901,938, U.S. Pat. 3,235,534 and French Pats. 1,423,518 and 1,424,158.

Example 196

0.5 g. of the dyestuff produced according to Example 2 are slurried with 0.5 g. of 80% acetic acid and dissolved in 4000 g. of hot water. 1.0 g. of 80% acetic acid, 2 g. of sodium acetate, 4 g. of a condensation product of olein alcohol and 15 mols of ethylene oxide, and 20 g. of a carrier, e.g. o-phenylphenol, are also added to the solution obtained. The pH of the solution is about 4.5. 100 g. of acid modified polyester fabric, e.g. Dacron 64, are introduced at 50°, the temperature is raised within 15 minutes to 100° and dyeing is performed at the boil for 1 hour. At the end of this time the dyebath is, for all practical purposes, exhausted. The dyed goods are treated for 15 minutes at 80° with the solution of 5 g. of a fatty alcohol sulphonate and then rinsed and dried. The fabric, which has been dyed in a vivid yellow-orange shade, has excellent fastness to light and, particularly, decatising.

Example 197

(a) 93 g. of aniline are suspended in a mixture of 400 g. of water and 200 ml. of acetone, and 8 g. of sodium acetate are added in one batch, 183.4 g. of 2,4,6-trichloropyrimidine dissolved in 200 ml. of acetone are then added dropwise and, while maintaining the reaction mixture at a temperature of 50–55°, 40 g. of sodium hydroxide dissolved in 160 g. of water are added at such a rate that the pH of the reaction mixture remains between 5 and 6 throughout the addition of the trichloropyrimidine. Stirring is then continued at the same temperature range for 4 hours, whereupon the acetonic phase formed is separated from the supernatant aqueous phase, and the acetonic phase is then evaporated to dryness.

The residue consists of a mixture of 85% by weight of 4-phenylamino-2,6-dichloro-pyrimidine and 15% by weight of 2-phenylamino-4,6-dichloro-pyrimidine; it is then dissolved in 500 ml. of 80° warm benzene, and, upon cooling, 56.4 g. of the 4-phenyl-amino isomer crystallize (M.P. 135–136°).

The mother liquor is then evaporated to dryness and redissolved in 280 ml. of benzene having a temperature of 80°. Upon cooling, another 101 g. of 4-phenylamino-2,6-dichloropyrimidine (M.P. 135–136°) crystallize. The final mother liquor separated from the crystals, can then be used for isolating the 2-phenylamino isomer therefrom. The second batch of crystals of the 4-phenylamino isomer obtained is still sufficiently pure to be used together with the first batch in the production of azo dyestuff coupling components therefrom on an industrial scale.

(b) 48 g. of 4-phenylamino-2,6-dichloro-pyrimidine obtained from step (a) are dissolved in 100 g. of dioxan, and 160 g. of water are added to the solution; to the resulting suspension there are added 30 g. of ethylamine in 30 g. of water, the reaction mixture is then heated to 85–90° during 6 hours with stirring, and stirring is continued while the mixture cools down to room temperature. Technically pure 4-phenylamino-2-ethylamino-6-chloro-pyrimidine having a melting point of about 90° precipitates and is separated by filtration and dried.

(c) 50 g. of the latter product are mixed with 30 g. of undiluted 2-amino-ethanol, and the mixture is heated with stirring at 140–150° for 2 hours. 4-phenylamino-2-ethylamino-6-($\beta$-hydroxyethylamino)-pyrimidine of syrupy consistency is obtained which can be used directly as coupling component in the production of dyestuffs as described in Examples 1 to 193.

Example 198

(a) The second mother liquor obtained as described under (a) in Example 197 is evaporated to dryness and a residue of 43.1 g. of crude 2-phenylamino-4,6-dichloro-pyrimidine (M.P. 90–91°) is obtained.

5 g. of this crude product are dissolved in 20 ml. of benzene and chromatographed on a 20 cm. x 5 cm. alumina column. The pure 2-phenylamino-4,6-dichloro-pyrimidine is eluted with benzene/chloroform (volume ratio 1:1) as eluting agent. It has a melting point of 111–112°.

(b) Step (b) of Example 197 is then repeated, but using 48 g, of 2-phenylamino-4,6-dichloro-pyrimidine as starting material, and, since the desired product does not precipitate, it is necessary to subject the reaction mixture to steam distillation. An orange-coloured resin is obtained which is dissolved in four times its amount (about 120 ml.) of ethanol at 80°. Upon cooling, 30 g. of purified 2-phenylamino-4-ethylamino-6-chloro-pyrimidine crystallizes. It is separated by filtration and dried, and has a melting point of 103–104°.

(c) Step (c) of Example 197 is repeated with this intermediate and a brown-coloured syrupy product consisting of 2-phenylamino-4-ethylamino-6-($\beta$-hydroxyethylamino) pyrimidine is obtained which can be used directly as coupling component in each of Examples 1 to 193, in lieu of the coupling components used therein.

Example 199

Step (a) of Example 197 is repeated, but in lieu of 93 g. of aniline, there are used 61 g. of 2-amino-ethanol; from the resulting mixture of two isomers, the 2-($\beta$-hydroxyethylamino)-4,6-dichloro-pyrimidine is isolated, and steps (b) and (c) of Example 198 are then repeated, but using aniline in lieu of 2-amino-ethanol in step (c).

2-($\beta$-hydroxyethylamino)-4-phenylamino-6-ethylamino-pyrimidine is obtained which can be used as coupling component in the preceding Examples 1 to 193 in lieu of any other coupling components used therein.

For instance, by repeating the procedure of Example 1, in which the diazonium compound from 2-amino-5-methyl 1,3,4-thiadiazole is used as diazo component, and employing as coupling component therein the above-described pyrimidine, there is obtained the mixed dyestuff consisting of the two isomers of the formula

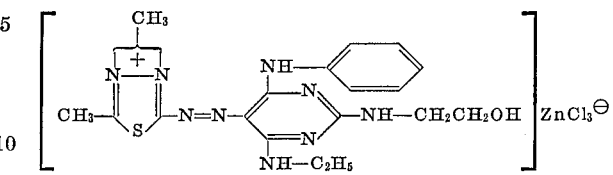

which dyes acid-modified polyacrylonitrile fibers in pure yellow-orange shades of good all round fastness properties.

Example 200

50 g. of 4-phenylamino-2-ethylamino-6-chloropyrimidine are mixed with an excess of undiluted cyclohexylamine, over the stoichiometrically required amount, and the mixture is heated in a closed vessel with stirring at 140–150° for 2 hours. 4-phenylamino-2-ethylamino-6-cyclohexylamino-pyrimidine of syrupy consistency is obtained which can be used directly as coupling component in the production of dyestuffs according to the invention in lieu of the coupling components used in Examples 1 to 193 supra.

Dyeings on acid-modified polyacrylonitrile fibers with the resulting dyestuffs have similar shades and fastness properties as those obtained with the dyestuffs of the preceding examples.

Example 201

(a) 48 g. of 4-phenylamino-2,6-dichloro-pyrimidine obtained from step (a) of Example 197 are dissolved in 100 g. of dioxan, and 160 g. of water are added to the solution; to the resulting suspension there are added 30 g. of ethylamine in 30 g. of water, the reaction mixture is then heated to 85–90° during 6 hours with stirring, and stirring is continued while the mixture cools down to room temperature. Technically pure 4-phenylamino-2-ethylamino-6-chloro-pyrimidine having a melting point of about 90° precipitates and is separated by filtration and dried.

(b) 50 g. of the latter product are mixed with an excess, above the stoichiometrically required amount, of sodium ethylate, dissolved in ethanol, and the mixture is heated with stirring at 110–120° for 2 hours. 4-phenylamino-2-ethylamino-6-ethoxy-pyrimidine of syrupy consistency is obtained which can be used directly as coupling component in Examples 1 to 193, in lieu of the coupling component used therein, in the production of dyestuffs of similar properties.

Example 202

Step (b) of Example 201 is repeated with 2-phenylamino-4-ethylamino-6-chloro-pyrimidine obtained as described in step (a) and (b) of Example 198 and a syrupy product consisting of 2-phenylamino-4-ethylamino-6-ethoxy-pyrimidine is obtained which can be used directly as coupling component in each of the preceding Examples 1 to 193, in lieu of the coupling component used in the latter, and dyestuffs of similar properties as those of the preceding dyestuffs are thereby obtained.

By repeating Examples 201 and 202, respectively, but using in lieu of sodium ethylate in step (b) of Example 201 an equivalent amount of sodium phenolate and sodium thiophenolate, respectively, and employing a temperature range of about 140–170° instead of 110–120°, there are obtained the following pyrimidine coupling components:

4-phenylamino-2-ethylamino-6-phenoxy-pyrimidine,
2-phenylamino-4-ethylamino-6-phenoxy-pyrimidine,
4-phenylamino-2-ethylamino-6-phenylthio-pyrimidine and
2-phenylamino-4-ethylamino-6-phenylthio-pyrimidine, which can be used as coupling components in Examples 1 to 193, in lieu of the coupling components used therein, whereby dyestuffs of similar properties as those described in these examples are obtained.

All other pyrimidine coupling components used in the foregoing examples can be produced individually in the manner described in Examples 197 to 202 and can be used to produce, by coupling them, in accordance with the well known procedures described in the foregoing Examples 1 to 168, with the diazo components, used in the latter examples as well as in Examples 169 to 193 the corresponding dyestuffs falling under Formula I.

EXAMPLE 203

(a) 577 g. of aqueous ethylamine solution (52%), 400 ml. of water and 200 g. of dioxan are placed in a flask. A mixture of 184 g. of 2,4,6-trichloropyrimidine in 200 g. of dioxan is added dropwise at 15–20°, the addition being made within 1–1½ hours while stirring and cooling. The whole is then heated to 80–85° and stirred for 5 hours under reflux. The reaction mixture is allowed to cool, taken up in 300 ml. of chloroform, the phases are separated in a separating funnel and the aqueous phase is extracted twice with 300 ml. of chloroform each time. The combined chloroform solutions are dried with sodium sulphate and evaporated to dryness. 208 g. of crude 2,4-bis-ethylamino-6-chloropyrimidine are obtained.

(b) 190 g. of crude 2,4-bis-ethylamino-6-chloropyrimidine, 476 g. of 52% aqueous ethylamine solution and 250 ml. of water are heated for 10 hours in an autoclave at 150–160°. After cooling, the aqueous phase is removed. The yellow-green mass which remains is then recrystallised from 550 ml. of 50% aqueous methanol. 118 g. of pure, almost colourless 2,4,6-tris-ethylamino-pyrimidine, M.P. 72–73° C., are obtained.

The symmetrical pyrimidine derivatives described in the examples are obtained in an analogous way.

Mixed dyestuffs such as described, e.g. in Example 1, are obtained, for instance, by mixing the two isomeric coupling components or the two isomeric azo dyestuffs in any desired proportion.

Preferably, however, mixtures are obtained by omitting the separation of the isomeric pyrimidines described following the first amination reaction under step (a) in Example 197 and using the unseparated isomer mixture of two phenylamino-dichloropyrimidines obtained from the said reaction directly as starting material for step (b) of the last mentioned example.

We claim:
1. A dyestuff of the formula

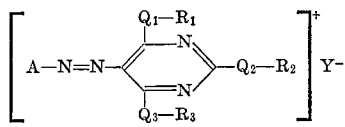

wherein
A represents a cyclammonium radical of the formula

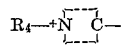

wherein $R_4$ represents alkyl having from 1 to 4 carbon atoms or alkyl of not more than 4 carbon atoms, monosubstituted by phenyl, cyano, carbamoyl or lower alkoxycarbonyl and
the residue

has at least one and at most 3 nitrogen atoms as ring members, the first one of which is the nitrogen atom substituted by $R_4$, any second nitrogen ring member of A is substituted by
(I) alkyl having at most 4 carbon atoms, unsubstituted or mono-substituted by phenyl, hydroxy, cyano, carbamoyl or lower alkoxy-carbonyl;
(II) cyclohexyl, or
(III) phenyl or phenyl substituted by halogeno, lower alkyl and lower alkoxy and any third nitrogen ring member of A is unsubstituted; and
wherein the residue

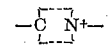

is selected from
(a) pyrazolyl-(3), or pyrazolyl-(5), the 3- and 4-positions of which being occupied by hydrogen, lower alkyl, lower alkoxy or phenyl,
(b) indazolyl-(3), indazolyl-(5), indazolyl-(6), or indazolyl-(3) being monosubstituted by halogeno, nitro, lower alkyl, lower alkoxy or lower alkylsulfonyl,
(c) thiazolyl-(2) or thiazolyl-(2) monosubstituted at a carbon atom by lower alkyl, phenyl, halogenophenyl, lower alkylphenyl or lower alkoxyphenyl,
(d) benzothiazolyl-(2), naphtho-(1',2',4,5)-thiazolyl-(2) or benzothiazolyl-(2) monosubstituted in the benzene nucleus thereof by halogeno, lower alkyl, lower alkoxy, cyano or thiocyano,
(e) 1,3,4-thiadiazolyl-(2) the 5-position of which being occupied by hydrogen, lower alkyl, phenyl, lower alkylphenyl or halogenophenyl,
(f) 1,2,4-triazolyl-(5), 1,3,4-triazolyl-(2) or 5-imino-1,2,4-triazolyl-(3),
(g) benzimidazolyl-(2) or benzimidazolyl-(7), the benzene nucleus of said benzimidazolyl radicals being unsubstituted or substituted by lower alkyl, lower alkoxy or halogeno,
(h) benzothiazolyl-(2)-phenyl-(4') or benzothiazolyl - (2) - phenyl-(4') monosubstituted in the condensed benzene nucleus by halogeno or lower alkyl,
(i) 1,2,3-triazolyl-(1)-phenyl-(2), benzo-1,2,3-triazolyl-(7), or 1,2,3-triazolyl-(1)-phenyl-(2') substituted in 5-position by lower alkyl or lower alkoxy-carbonyl,
(j) pyridyl, lower alkyl-pyridyl, quinolyl-(4) or lower alkylquinolyl-(4),
(k) pyridazinyl or pyridazinyl monosubstituted at a carbon atom by lower alkoxy, phenyl or halogeno;
one of $Q_1$, $Q_2$ and $Q_3$ represents —NH—, —O— or —S— and the other two Q's represent —NH—; and each of $R_1$, $R_2$ and $R_3$ represents
($\alpha$) alkyl having from 1 to 8 carbon atoms,
($\beta$) alkyl substituted by hydroxy, cyano, lower alkoxy, lower alkanoyloxy, carbamoyl, phenyl, methylphenyl, phenoxy, phenylthio, a grouping

and a grouping

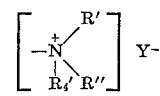

in which groupings each of
R' and R" represents lower alkyl and
$R_4'$ represents lower alkyl, cyclohexyl or benzyl,
($\gamma$) cyclohexyl,
($\delta$) phenyl or phenyl substituted by lower alkyl, lower alkoxy or halogeno,
($\epsilon$) naphthyl,
halogeno represents chlorine or bromine, and
$Y^-$ represents an anion.

2. A dyestuff as defined in claim 1, wherein the residue $$-\overset{\hspace{0.3em}\ulcorner\hspace{-0.3em}-\hspace{-0.3em}\urcorner}{\underset{\llcorner\hspace{-0.3em}-\hspace{-0.3em}\lrcorner}{C\hspace{1em}N^{+}}}-$$

is selected from
(i) 1,3 - di-loweralkyl-pyrazolyl-(5), 1-phenyl-3-loweralkyl-pyrazolyl-(5), 1 - halogenophenyl-3-loweralkyl-pyrazolyl-(5), 1-loweralkylphenyl - 3 - loweralkyl-pyrazolyl-(5) or 1-lower alkoxyphenyl - 3 - loweralkyl-pyrazolyl-(5),
(ii) indazolyl-(3) the benzene ring of which is monosubstituted by halogeno or nitro,
(iii) thiazolyl-(2) or lower alkyl-thiazolyl-(2),
(iv) benzothiazolyl-(2) or lower alkoxy-benzothiazolyl-(2),
(v) 1,3,4-thiadiazolyl-(2) or lower alkyl-1,3,4-thiadiazolyl-(2),
(vi) 1,2,4-triazolyl-(5)
(vii) lower alkyl-quinolyl-(4) and
(viii) 6-lower alkoxy-pyridazinyl-(3).

3. A dyestuff as defined in claim 1, wherein each of $Q_1$, $Q_2$ and $Q_3$ represents —NH—.

4. A dyestuff as defined in claim 3, wherein each of $Q_1$, $Q_2$ and $Q_3$ represents —NH—, each of $R_1$ and $R_2$ is selected from lower alkyl and hydroxy-lower alkyl, and $R_3$ represents lower alkyl, phenyl or phenyl substituted by a member selected from lower alkyl, lower alkoxy and halogeno.

5. A dyestuff as defined in claim 1, wherein one of $Q_1$, $Q_2$ and $Q_3$ is —O— and the remaining two are —NH—.

6. A dyestuff as defined in claim 5 wherein one of the groupings —$Q_1$—$R_1$ and —$Q_2$—$R_2$ represents lower alkoxy or phenoxy; the remaining Q and $Q_3$ each represent —NH—.

7. A dyestuff as defined in claim 3, which is of the formula wherein $Y^-$ represents one the anions $CH_3SO_4^-$, $Cl^-$ or $ZnCl_3^-$.

8. A dyestuff as defined in claim 3, which is a mixture of the two isomers of the formulas and in a molar ratio of from about 1 to 1, $Y^-$ representing one of the anions $CH_3SO_4^-$, $Cl^-$ or $ZnCl_3^-$.

9. A dyestuff as defined in claim 3, which is of the formula wherein $Y^-$ represents one of the anions $CH_3SO_4^-$, $Cl^-$ or $ZnCl_3^-$.

10. A dyestuff as defined in claim 3, which is of the formula wherein $Y^-$ represents one of the anions $CH_3SO_4^-$, $Cl^-$ or $ZnCl_3^-$.

11. A dyestuff as defined in claim 3, which is of the formula wherein $Y^-$ represents one of the anions $CH_3SO_4^-$, $Cl^-$ or $ZnCl_3^-$.

12. A dyestuff as defined in claim 3, which is of the formula wherein $Y^-$ represents one of the anions $CH_3SO_4^-$, $Cl^-$ or $ZnCl_3^-$.

References Cited
UNITED STATES PATENTS 3,042,648   7/1962   Lewis _____ 260—154X
3,481,918   12/1969  Straley et al. _____ 260—154

FLOYD DALE HIGEL, Primary Examiner

U.S. Cl. X.R.

8—4, 13, 41, 42, 43, 71; 106—288; 117—138.8, 142, 143; 260—37, 40, 41, 147, 154, 251, 256.4